United States Patent [19]

Hakoun et al.

[11] Patent Number: 5,218,184

[45] Date of Patent: Jun. 8, 1993

[54] ARC FUSION SPLICER FOR OPTICAL FIBERS UTILIZING LOW AND HIGH ACCURACY DISPLACEMENT MEANS

[75] Inventors: Roland Hakoun, Domont; Gérard Godard, Noiseau; Jean-Claude Resbeut, Saint Ouen l'Aumone, all of France

[73] Assignee: Alcatel Fibres Optiques, Bezons Cedex, France

[21] Appl. No.: 818,092

[22] Filed: Jan. 8, 1992

[30] Foreign Application Priority Data

Jan. 8, 1991 [FR] France .................. 91 00157

[51] Int. Cl.$^5$ .................. G02B 6/36; G02B 6/25; G02B 21/04
[52] U.S. Cl. .................. 219/383; 385/96; 385/97; 269/902; 269/58; 65/4.2; 65/152
[58] Field of Search .................. 219/383, 521; 385/97, 385/98, 96; 269/58, 71, 902, 142; 65/152, 4.2

[56] References Cited

U.S. PATENT DOCUMENTS

| | | | |
|---|---|---|---|
| 4,118,618 | 10/1978 | Gauthier et al. | 65/152 |
| 4,142,777 | 3/1979 | Gauthier et al. | 385/64 |
| 4,148,559 | 4/1979 | Gauthier | 385/55 |
| 4,615,097 | 10/1986 | Genequand | 29/466 |
| 4,687,287 | 8/1987 | Lukas et al. | 385/98 |
| 4,695,306 | 9/1987 | Hakoun et al. | 65/152 |
| 4,735,481 | 4/1988 | Lukas et al. | 385/96 |
| 4,825,092 | 4/1989 | Mehadji | 250/227 |
| 4,914,797 | 4/1990 | Tsuchida et al. | 385/96 |
| 5,002,351 | 3/1991 | Szanto et al. | 385/96 |
| 5,013,345 | 5/1991 | Itoh et al. | 65/4.2 |
| 5,156,663 | 10/1992 | Itoh et al. | 65/4.2 |

FOREIGN PATENT DOCUMENTS

| | | |
|---|---|---|
| 0237426 | 9/1987 | European Pat. Off. |
| 0319041 | 6/1989 | European Pat. Off. |
| 427705 | 5/1991 | European Pat. Off. |
| 3538563 | 5/1987 | Fed. Rep. of Germany |

OTHER PUBLICATIONS

Journal of Optical Communications, vol. 10, No. 2, Jun. 1989, pp. 61-66, Berlin, Germany; A. Ishikura et al.: "Mass Splice Method for Single-Mode Fiber Ribbons".
Patent Abstracts of Japn, vol. 11, No. 303 (P-622)(2750), Oct. 3, 1987; & JP-A-62094803 (Mitsubishi Cable Ind.), May 1, 1987.
Patent Abstracts of Hapan, vol. 6, No. 265 (P-165)(1143), Dec. 24, 1982; & JP-A-57158825 (Fujitsu K.K.) Sep. 30, 1982.
Patent Abstracts of Japan, vol. 6, No. 100 (P-121)(978), Jun. 9, 1982; & JP-A-57032411 (Nippon Denshin Denwa Kosha), Feb. 22, 1982.
Patent Abstracts of Japan, vol. 6, No. 225 (P-154)(1103), Nov. 10, 1982; & JP-A-57129405 (Nippon Denshin Denwa Kosha) Aug. 11, 1982.

*Primary Examiner*—Bruce A. Reynolds
*Assistant Examiner*—John A. Jeffery
*Attorney, Agent, or Firm*—Sughrue, Mion, Zinn, Macpeak & Seas

[57] ABSTRACT

A micro-welder for optical fibers includes a stand having a central support surrounded by two lateral supports or beams. The beams are suitable for moving under drive from a bending movement about respective X-axes. The stand also supports a device for securing optical fibers on the beams and a device for accurately guiding the fibers on the central support. A low accuracy first displacement device is adapted to displace the beams to bring the fibers into end-to-end contact with each other by relative translation movement along their longitudinal Z-axis which is orthogonal to the X-axes. A high accuracy second displacement device is adapted for moving the beams to drive the fibers with accurate relative translation movements along the Z-axis. Two welding electrodes are provided and an optical device which includes a microscope for observing the ends of said optical fibers. The micro-welder second displacement device (25, 25') enables a continuous cycle of relative translation movements to be performed between the fibers (F, F') along the Z-axis in both directions. Further, the optical device includes a mechanism co-operating with the microscope (27) and enabling a single image of the optical fibers (F, F') to be obtained before and after welding as seen along two mutually orthogonal viewing directions.

19 Claims, 5 Drawing Sheets

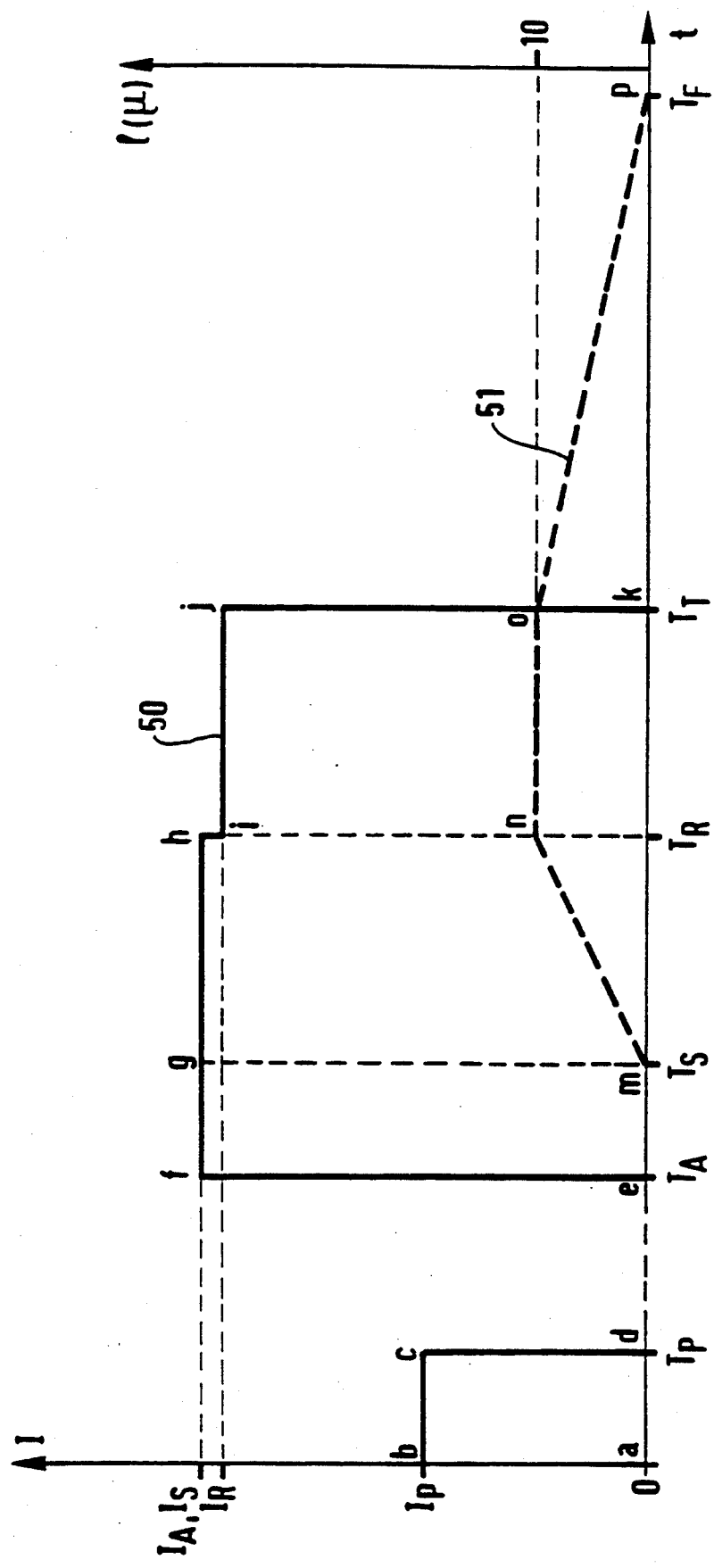

ARC FUSION SPLICER FOR OPTICAL FIBERS UTILIZING LOW AND HIGH ACCURACY DISPLACEMENT MEANS

The present invention relates to a micro-welder for optical fibers and to a welding method implemented by using the micro-welder.

The conventional method of welding two optical fibers end to end comprises three main stages:

polishing the facing sections of the optical fibers to be welded together;

welding per se; and a traction stage for verifying the weld by cold drawing: if the weld remains in the elastic region, then the weld is good, with the plastic region being very small and negligible.

One possible welding device is described in patent JP-57 129405. That device includes two lateral supports forming the branches of a U-shaped stand, one of which is bendably movable about a horizontal axis orthogonal to the longitudinal axis of the fibers to be welded. Each of the lateral supports is intended to receive at least one optical fiber to be welded, which fiber is disposed along said axis in a V-guide provided for this purpose on the support. The base of the moving support has a portion of reduced thickness serving as a hinge and enabling it to perform bending movements. It is permanently in contact with a micrometer spindle pressing against one of its vertical faces orthogonal to the longitudinal axis of the fibers.

To make the weld, the fibers are positioned with their ends to be welded facing each other, and an electric arc is struck between two electrodes where the fibers are to join. Simultaneously, the micrometer spindle is rotated so as to enable the fibers to interpenetrate during welding, and so as to apply traction to them after the weld has been made.

Such a device is unsatisfactory since the displacements obtained by means of the micrometer spindle are not sufficiently accurate to ensure that the weld is of good quality.

An object of the present invention is therefore to provide a micro-welder that enables prepositioning to be performed before welding and that enables the fibers to be moved during and after accurate welding.

To this end, the present invention provides a micro-welder for connecting optical fibers together, the micro-welder comprising two "lateral" supports forming the branches of a U-shaped stand, one of said lateral supports being movable in bending or rotation about a horizontal axis orthogonal to the longitudinal axis of the fibers to be welded together, and each of said lateral supports respectively including at least one fiber to be welded, said micro-welder comprising:

means for securing said optical fibers to said lateral supports;

electrodes for performing the welding; and first displacement means of low accuracy for displacing said moving lateral support to move said ends towards each other in translation movement along a displacement direction parallel to the longitudinal axis of said fibers carried by said moving support:

the micro-welder being characterized in that said stand further includes:

a central support lying in an intermediate space between said lateral supports and provided with guide means for guiding the ends of said fibers to be welded together so that they face each other; and second displacement means of high accuracy for said moving lateral support to drive said fibers carried by said moving support through accurate translation movements along said displacement direction, said second means being constituted by a cam bearing against said moving lateral support from the outside of said intermediate space and suitable for performing rotary motion about a vertical axis orthogonal to said longitudinal axis, said first displacement means also being used to displace said axis of rotation of said cam in a vertical plane that contains said axis of rotation and that is parallel to said longitudinal axis.

By using the micro-welder of the invention, it is possible to perform two types of displacement: low accuracy displacements enabling the fibers to be positioned before beginning to weld, and high accuracy displacements for causing the fibers to interpenetrate and then for applying traction after welding. In addition, the use of cams having a suitable profile confers high accuracy to the displacements.

According to an important feature, the first displacement means press directly against said second displacement means, said first and second displacement means thus being disposed relative to said moving lateral support on the outside of said intermediate space. This makes it easy to effect the low accuracy displacements without being hindered by the presence of the cam.

According to an important feature, each of the lateral supports is moving and is provided respectively both with its own one of said first displacement means and its own one of said second displacement means.

The first displacement means may be constituted by at least one micrometer spindle controlled by a manual advance knob.

One of the lateral supports may be made stationary, or capable of performing low accuracy displacements only (in which case it is in contact solely with the first displacement means), or else it may be capable of performing high accuracy displacements only (in which case it is in contact solely with the second displacement means).

According to another feature, the stand and the central support are integral and are made of molded plastic. Under such circumstances, the lateral supports are both hollowed out at their bottom portions in contact with the stand such that said bottom portions of thickness reduced in this manner act as hinges.

The micro-welder is thus cheap, and the translation movements of the lateral supports are obtained by imparting bending movements thereto about the horizontal axes passing through the hinges.

When the lateral supports are independent of the stand, it is also possible to fix them to the stand by means of hinge components.

The means for fixing the fibers to the lateral supports may be two cylindrical metal mandrels fixed to the lateral supports by magnets inserted for this purpose inside the lateral supports.

The accurate guidance means may be constituted, for example, by two V-shaped guides machined in a piece of ceramic fixed to the central support.

Advantageously, the electrodes are disposed in a horizontal plane containing the guide means and extending orthogonally to said guide means.

According to an additional improvement, the micro-welder of the invention further includes an optical device for observing the ends of the fibers to be welded together. This device comprises a microscope and optical means for co-operating with the microscope to form simultaneous images of the ends as seen along two mutually orthogonal viewing directions.

The optical means may be constituted by two mirrors disposed symmetrically about a vertical Y-axis orthogonal to the longitudinal axis, each mirror being inclined at an angle α/2 relative to the Y-axis and being situated beneath a portion of a horizontal plane containing the ends of the fibers, and facing said portion. The mirrors may be retractable and removable.

The value of the angle α may vary around 135°, depending on the accuracy of the mechanical assembly and on the field of view of the optical device. Depending on the selected focal length, it is then possible to observe:

the ends of the fibers and of the electrodes as seen from above; or the ends of the fibers as seen along two mutually-orthogonal viewing directions.

In a variant of the optical device, the optical means comprise four mirrors situated above the above-mentioned portion of a plane, and disposed symmetrically about the Y-axis, two of the mirrors being parallel and on opposite sides of the Y-axis, and the other two being inclined at an angle β relative to the Y-axis and likewise situated on opposite sides thereof, the value of the angle β varying around 45°.

Finally, the electrodes may be removable to enable them to be replaced or cleaned in the event of wear.

The micro-welder constituted in this way can be used in a welding method including a stage in which the mean position of the ends of the fibers relative to each other is adjusted using the first means, followed by a stage in which said position is adjusted finely and in which the ends are displaced with high accuracy using the second means.

More precisely, the method may comprise the following operations:

polishing the end and side surfaces of the fibers before putting the ends of the fibers into contact with each other;

striking an arc between the electrodes when the fibers have been put into end-to-end contact using the first means;

arc welding the fibers while simultaneously causing the fibers to interpenetrate;

annealing the weld formed in this way;

applying traction to the fibers;

the traction being applied in a continuous cycle directly after the annealing, the outside profile of the cam(s) being adapted so that rotation of the cam(s) firstly causes the fibers to interpenetrate, then maintains the interpenetration constant during the annealing, and finally enables the traction to be applied to the fibers, these three stages following one another without interruption in the motion of the cam(s) in a continuous cycle of relative translation movements of the fibers.

Other characteristics and advantages of the present invention appear from the following description of an implementation of the micro-welder of the invention, given by way of non-limiting illustration.

In the accompanying figures:

FIG. 7 illustrates a welding cycle using a micro-welder of the invention.

In FIGS. 1 to 6, common items are given the same reference numerals.

Figure 1:
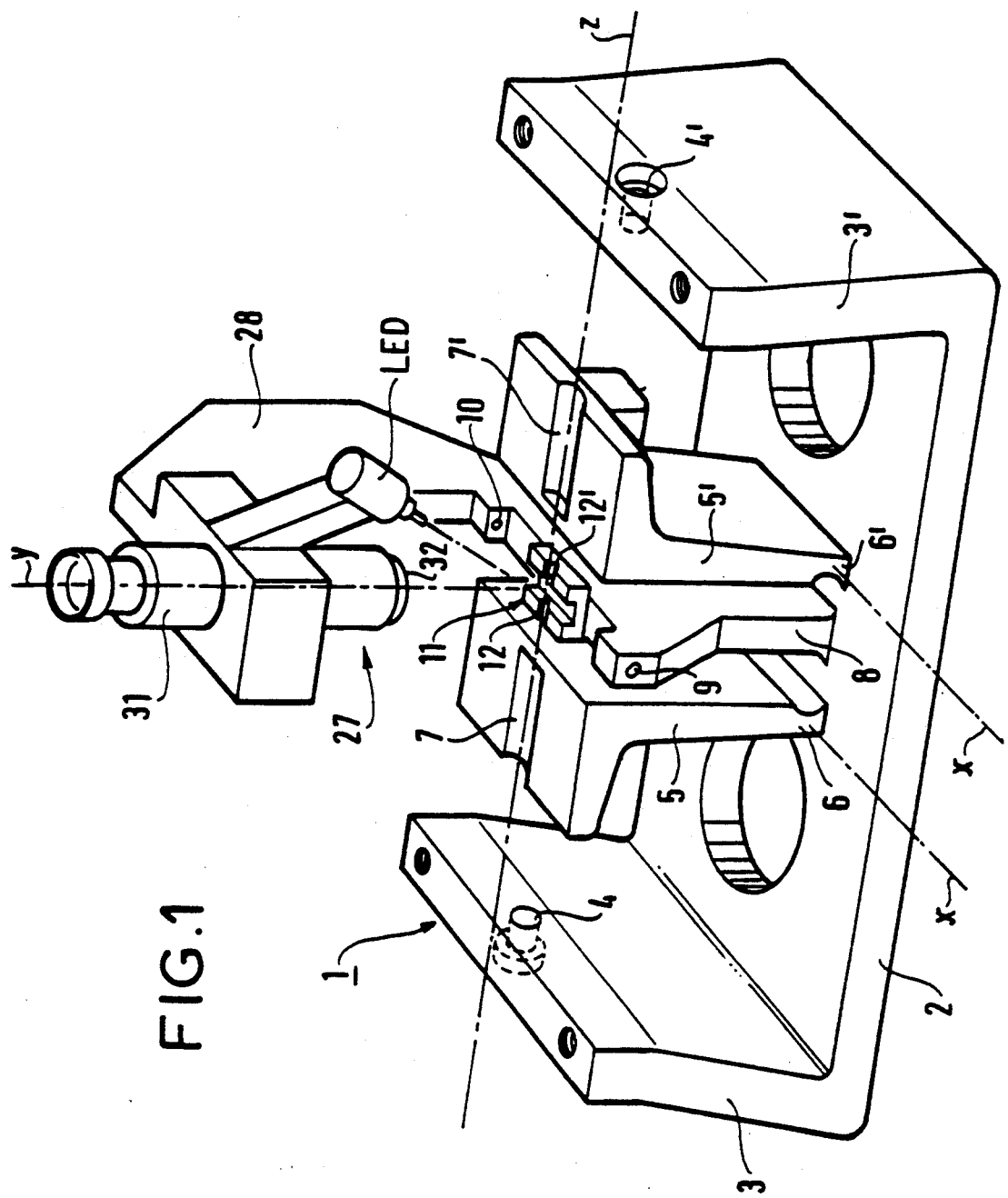
FIG. 1 is a diagrammatic perspective view of the functional portion of a micro-welder of the invention.

In FIG. 1, a stand 1 made of molded plastic comprises a horizontal base 2 with two vertical plates 3 and 3' at respective ends giving the stand 1 an overall U-shape. Each of these plates includes a respective bore 4 or 4' for receiving means for initial and low-accuracy displacement of the fibers.

Two vertical lateral supports 5 and 5' are situated between the plates 3 and 3' and are disposed symmetrically about the vertical axis of symmetry Y of the stand.

The bottom portions of the lateral supports 5 and 5' where they come into contact with the base 2 are of reduced thickness, thereby constituting two thin portions or hinges 6 and 6' enabling said supports to perform movements under the action of bending moments about respective X-axes that are horizontal and parallel to the lines of contact between each of the supports 5 and 5' and the base 2. In addition, each of them has an open recess 7 or 7' machined therein that is semicylindrical in shape. Finally, a vertical central support 8 for receiving in particular an optical device and two electrodes is situated between the lateral supports 5 and 5' and is centered on the Y-axis. The central support 8 has two bores 9 and 10 for receiving respective electrodes. In addition, a ceramics block 11 having two V-shaped guides 12 and 12' machined therein is fixed on the central support 8 in such a manner that the V-shaped guides 12 and 12' lie on the horizontal axis Z which is orthogonal to the X-axes and symmetrical about the Y-axis. Advantageously, in the embodiment described, the base 2, the plates 3 and 3', the lateral supports 5 and 5', and the central support 8 are integrally formed as a single plastic molding.

Figure 2:
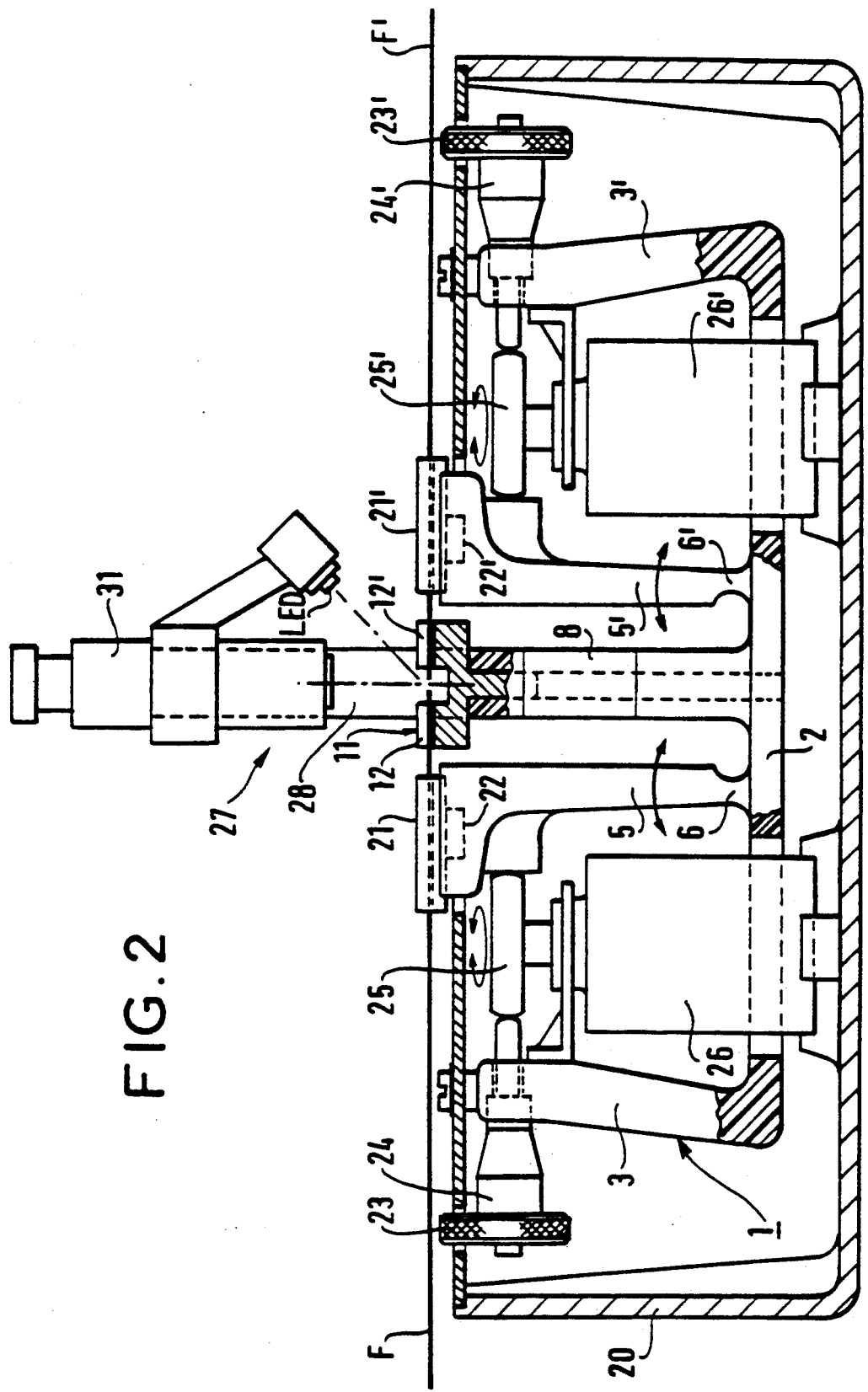
FIG. 2 is a section through a micro-welder of the invention.

FIG. 2 shows more clearly the means used for holding the fibers to the stands, for displacing them, and for welding them together. The stand 1 of the preceding figure is installed in a housing 20.

Two cylindrical metal fiber-carrying mandrels 21 and 21' carrying the fibers F and F' respectively are fixed to the lateral supports 5 and 5' magnetically by means of two magnets 22 and 22' incorporated in the lateral supports 5 and 5' during molding thereof; the fibers F and F' are not in contact with each other.

The lateral supports 5 and 5' are capable of moving under the action of bending movements, as explained with reference to the preceding figure. These movements have two functions:

translation movements for prepositioning the fibers before welding; these movements do not require very high accuracy along the Z-axis; and translation movements for interpenetration during welding and for applying traction to the fibers when cold after welding; these movements must be very accurate (to within a few microns).

The low accuracy movements of the lateral supports are manually controlled by two manual advance knobs 23 and 23' for controlling two micrometer spindles 24 and 24' situated respectively on opposite sides of the lateral supports 5 and 5'. Movement of the spindles 24 and 24' along the Z-axis causes the lateral supports 5 and 5' to advance (or retreat) through 20 μm per graduation of the knobs 23 and 23' because of the resilient properties of the plastic and because of the hinges 6 and 6'. The micrometer spindles 24 and 24' apply stress to the lateral supports 5 and 5' in the form of bending movements.

For high accuracy movements, two cams 25 and 25' are used that are placed between the spindles 24 and 24' and the lateral supports 5 and 5'. Each of the cams is driven by a respective DC micromotor 26 or 26'.

Thus, when the motors 26 and 26' are switched on, they rotate the cams 25 and 25' about respective vertical axes that are orthogonal to the Z-axis, thereby driving the fibers F and F' through accurate translation movements along the Z-axis, with each translation movement being a direct function of the outside profile of the corresponding cam 25 or 25'. Thus, by acting on the micrometer spindles 24 and 24', the lateral supports 5 and 5' are moved with low accuracy, and the axis of rotation of each of the cams is displaced in a vertical plane parallel to the Z-axis and containing the axis of rotation. The operation of the micro-welder designed in this way is explained in greater detail below as is the special welding cycle that it makes it possible to achieve.

Finally, the central support 8 is integral with an overhanging support 28 carrying a microscope 26 that forms a portion of the observation optical device.

Figure 3:
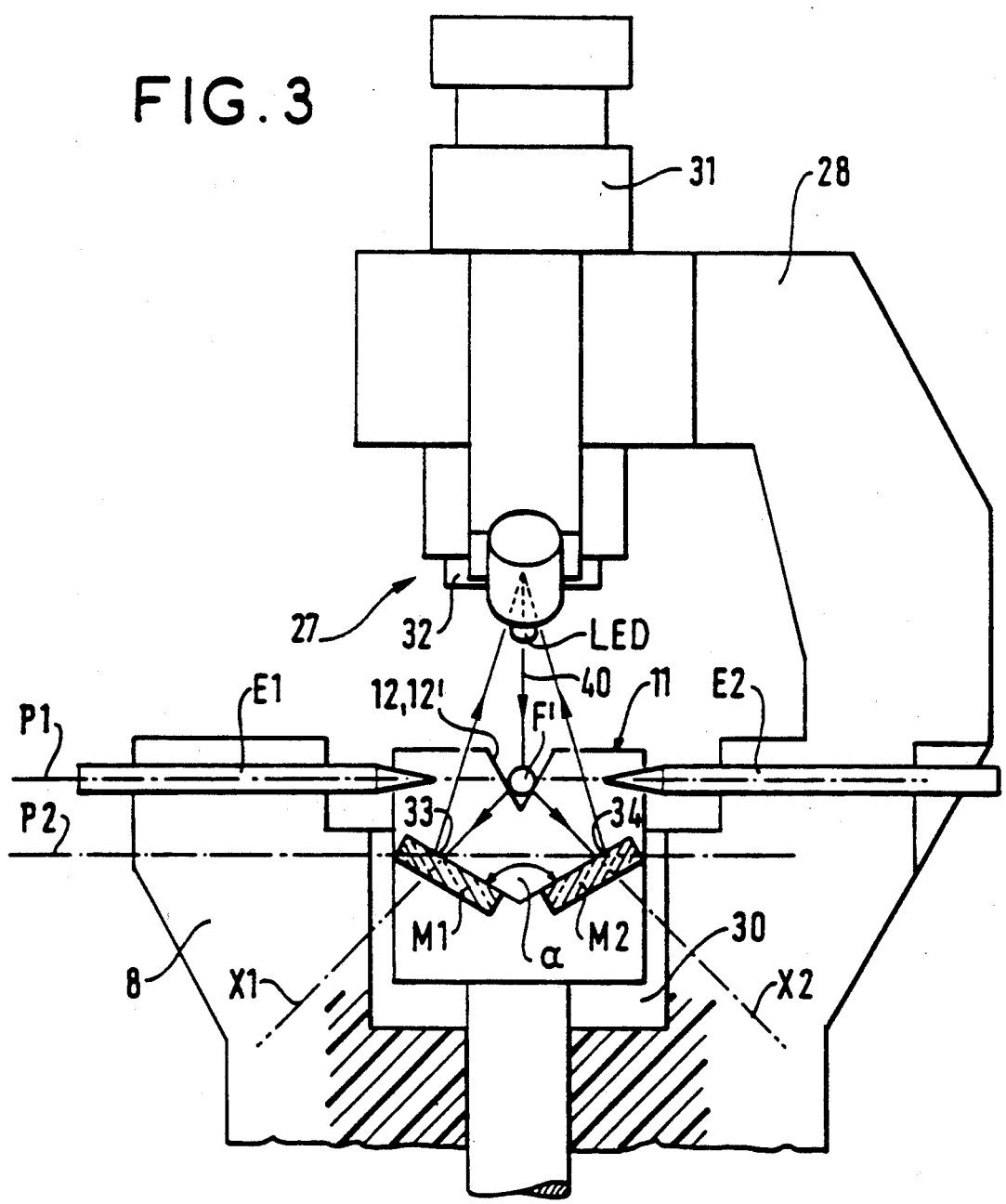
FIG. 3 is a diagrammatic transverse view of the central portion of FIG. 2.

FIG. 3 shows the microscope 27 of FIG. 2 in detail together with the main components of the observation optical device.

In this figure, in addition to the two electrodes E1 and E2, there can be seen a chamber 30 provided in the support 8 for housing two mirrors M1 and M2. The microscope 27 includes a single eyepiece 31 providing ×50 magnification, an objective lens 32, and a light-emitting diode LED.

The mirrors M1 and M2 are situated beneath a portion of a horizontal plane P1 containing the ends of the electrodes E1 and E2 and of the fibers to be welded together F and F' (only the end of F' is visible in FIG. 3). Between them they form an angle α of 135°, and their point of intersection in FIG. 3 is vertically below the section of the fiber F'.

By having the mirrors M1 and M2 in this disposition, it is possible to observe the fibers F and F' in two perpendicular directions.

Figure 4:
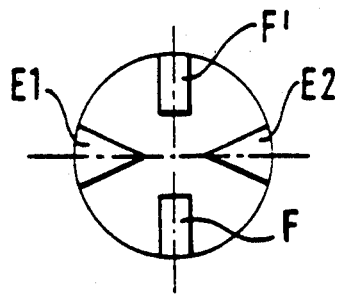
FIGS. 4 and 5 show the images obtained using the optical device on FIG. 3.

If the objective lens 32 is focused on the horizontal plane P1, then images of the two fibers F and F' (also referenced F and F') and of the electrodes E1 and E2 (also referenced E1 and E2) will be seen from above through the eyepiece 31 as shown in FIG. 4. It is thus possible to verify the state of the electrodes and to change them if they are worn. This also makes it possible to verify the alignment and the positioning of the fibers F and F' relative to each other.

Figure 5:
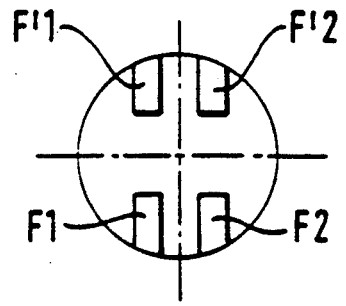

Otherwise, the same image can be used to observe the fibers F and F' as seen along two mutually perpendicular viewing directions X1 and X2. FIG. 3 uses solid lines to represent the path of a beam 40 from the LED when the objective lens 32 is focused on a horizontal plane P2 intersecting the mirrors M1 and M2. The beam 40 from the LED conveys two images 33 and 34 of the two facing fibers F and F' on the mirrors M1 and M2 respectively. These two images are reflected to the objective lens 32 and the fibers F and F' are observed in two orthogonal directions as shown in FIG. 5. This figure shows the images F1 and F'1 of the fibers F and F' as seen along viewing direction X1, and the images F2 and F'2 of the fibers F and F' as seen along viewing direction X2.

Figure 6:
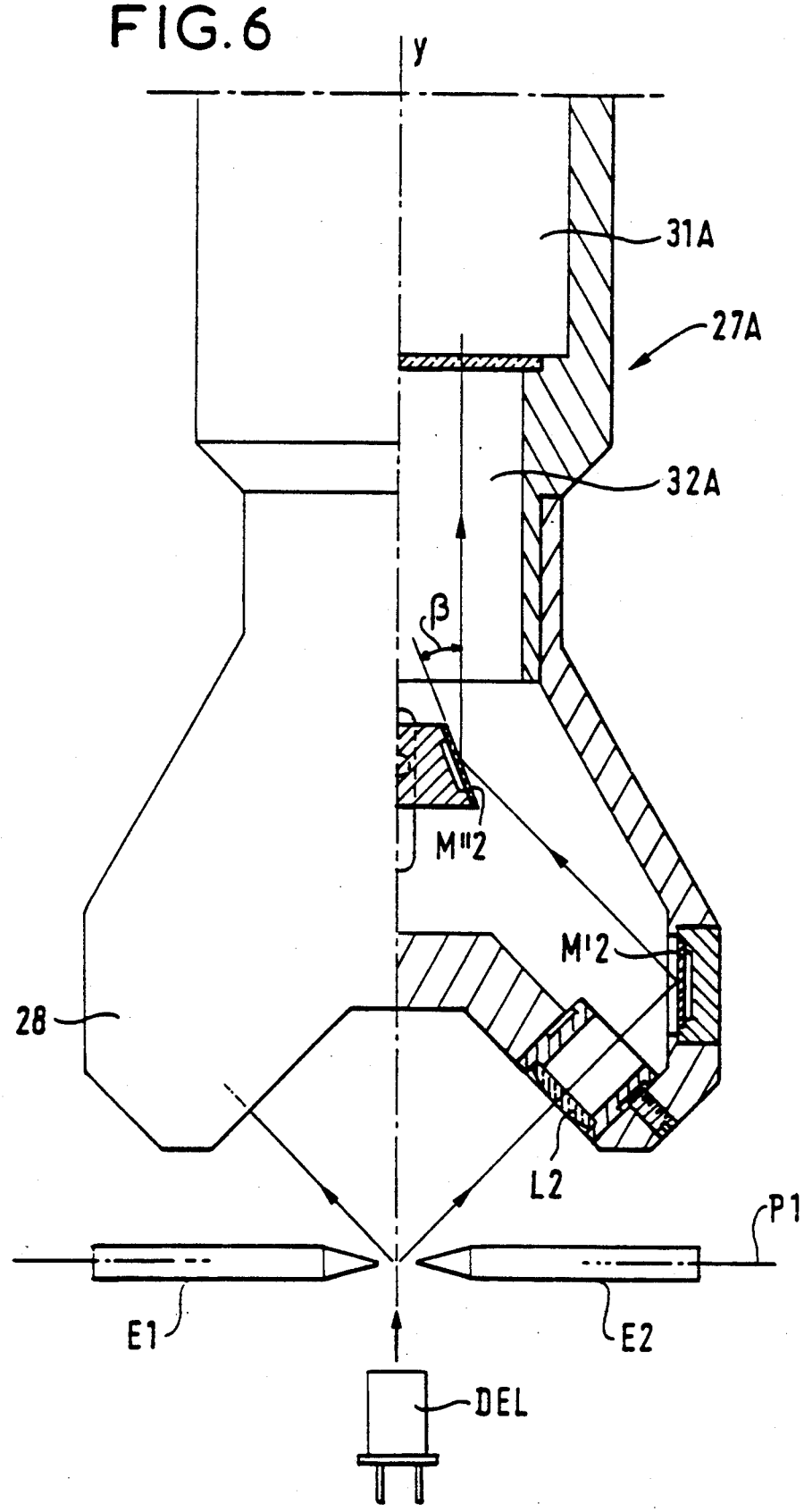
FIG. 6 shows another possible optical device for a micro-welder of the invention.

FIG. 6 shows another possible optical device for a micro-welder of the invention. In this case, the chamber 30 of the support 8 (not shown) is designed to receive the LED, and the mirrors are above the plane P1 and are housed inside the support 28. The microscope 27A includes an eyepiece 31A and an objective lens 32A, it is symmetrical about the Y-axis, and the righthand half only of the optical device is shown partially cutaway in which there can also be seen a lens L2 and two mirrors: a vertical mirror M'2 and a mirror M"2 that slopes at an angle β of 45° relative to the Y-axis. The assembly is housed inside the support 28.

The same results are obtained as with the optical device of FIG. 3.

The optical device is simple and effective in handling since to obtain an image as seen along two mutually perpendicular viewing directions simultaneously, it suffices merely to adjust the objective lens quickly. This "two-axis" optical device also makes it possible to observe the state of the electrodes and optionally to clean or change the electrodes should that be necessary.

In one particular way of using the micro-welder of the invention, each of the fibers F and F' is initially loaded into a respective mandrel 21 or 21', and then the fibers F and F' are sectioned so as to:

leave a given length of each fiber projecting beyond the mandrels 21 and 21'; and obtain facing faces on each of the fibers that are at 90° relative to the longitudinal axes thereof.

The two mandrels are placed in housings provided for this purpose in the lateral supports 5 and 5', and the two fibers F and F' are moved towards each other without coming into contact by means of the micrometer spindles 24 and 24' which are moved manually by the advance knobs 23 and 23'. This also has the effect of displacing the axis of rotation of each of the cams 25 and 25'. Thereafter, the end surfaces and the lateral surfaces of the fibers F and F' are polished by applying an arc using the electrodes E1 and E2, with this being done specifically to burn off any dust that may still be present at this stage on the fibers F and F'. The continuous cycles specific to the micro-welder of the invention can then be started by means of a control button situated on the front face (not shown) of the housing 20. The profile of the cams 25 and 25' is selected so that after the cams have been put into rotation by the motors 26 and 26', their first effect is to cause the fibers F and F' to interpenetrate, with the fibers simultaneously being melted by the arc produced by the electrodes so that interpenetration is possible. Thereafter, the curve of the cam profile enables the lateral supports 5 and 5' to be held in fixed positions during an annealing period, and finally (still continuously and automatically, and without any outside intervention) the cam profile is such as to allow the lateral supports 5 and 5' to return progressively to their initial positions (because of the appropriate elastic properties of the plastic used), thereby applying the required traction.

The continuous line curve 50 in FIG. 7 represents the arcing current I between the electrodes E1 and E2 as a function of time t.

Dashed line curve 51 shows the length l of interpenetration between the fibers F and F' as a function of time t.

In the example illustrated by the curves 50 and 51, the fibers F and F' are 125 μm in diameter.

Portion abcd of curve 50 shows the polishing current $I_p$ applied during time $T_p$ that suffices to eliminate dust and surface defects, inter alia.

The fibers F and F' are then (after an arbitrary length of time) brought into contact with each other by means of the micrometer spindles 24 and 24'. Then, at an instant $T_A$, an arc is struck between the electrodes for a sufficient length of time to enable the fibers to melt and to adhere. The arcing current during this stage, referred to as the adherence current, is written $I_A$. The adherence stage is represented by portion efg of curve 50; it prepares for the welding stage per se.

Welding begins at an instant $T_S$ at the end of the adherence stage. An arc is then applied between the electrodes at a current $I_S$. At the same instant $T_S$, the micromotor is switched on and they rotate the cams 25 and 25' through one-third of a turn, thereby moving the fibers F and F' in translation, thereby causing the two fibers to interpenetrate over a length 10 μm. This interpenetration is linear as a function of time and it increases as the fibers melt under the effect of the plasma arc generated by the electrodes. It is necessary to perform such interpenetration in order to have a sufficient quantity of material at the weld.

The welding stage is represented by portion ghi of curve 50, and the simultaneous interpenetration stage is represented by the portion mn of the curve 51.

Following the welding stage, an annealing stage begins at an instant $T_R$ and continues for a sufficient length of time to avoid the glass from which the optical fibers are made being quenched (the annealing temperature is lower than the melting temperature of the glass). The arcing current $I_R$ during this stage is lower than the arcing current during the welding stage, and is adapted to the type of fiber being welded. During this annealing stage, rotation of the cams does not give rise to additional interpenetration, and the interpenetration length remains constant and equal to 10 μm. At the instant $T_T$ at the end of annealing, the cams have rotated through one-half turn each. The annealing stage is represented by portion ijk of curve 50 and by portion no of curve 51. Finally, traction begins at instant $T_T$: the cams return to their initial state as they were prior to welding and they terminate their turn of rotation. This makes it possible, by virtue of the elasticity of the plastic from which the lateral supports 5 and 5' are made, for the supports to return progressively, thereby applying traction to the fibers F and F' and returning the interpenetration length to zero at instant $T_F$ (portion op of curve 51). The elongation obtained in this way on returning to the initial state is about 0.3%.

The cost of the micro-welder of the invention is about three times less than that of conventional prior art micro-welders. Because it is possible to use parts made of molded plastic, the micro-welder of the invention can be used to interconnect a wide range of monomode or multimode optical fibers (of diameters lying in the range 125 μm to 200 μm).

It thus makes it possible to perform rapid repairs on site and to make line measurements. It provides welds that have less than one decibel of attenuation, with attenuation being equal to 0.5 dB on average.

Naturally, the present invention is not limited to the embodiment and the implementation described above.

In particular, it is not essential for the lateral supports to be integrally molded with the stand. They could be fixed thereto by two hinge pieces, for example, that enable them to have sufficient bending movement about the X-axes.

In addition, it is possible to use one cam only. In which case there would be a "reference" fiber that remains stationary during welding and traction, and a "moving" fiber secured to one of the lateral supports whose movements follow the profile of the cam.

The mirrors of the observation system in FIG. 2 may be retractable and removable. Thus, when striking arcs between the electrodes, the mirrors can be retracted to avoid matter being deposited on the surfaces thereof. In addition, they may be changed if they are damaged or dirtied, and they may optionally be cleaned if they become dusty.

The diagrammatic representation of FIG. 2 is not limiting in any way: depending on the diameter of the fibers to be welded, it is possible to select different currents $I_p$, $I_A$, $I_S$, $I_R$ and different durations for each stage by means of control keys and indicators placed on a front face of a micro-welder of the invention, for example. Similarly, the profile(s) of the cam(s) may be selected as a function of the desired interpenetration and traction characteristics.

It is nevertheless appropriate to optimize the selected characteristics in order to enable a maximum amount of welding to be performed by the micro-welder between changing batteries in the event of the micro-welder operating with replaceable batteries or with rechargeable batteries. The micro-welder of the invention may also be connected to mains.

Naturally, any means may be replaced by equivalent means without going beyond the ambit of the invention.

We claim:

1. A micro-welder for connecting optical fibers together, the micro-welder comprising two lateral supports forming the branches of a U-shaped stand, at least one of said lateral supports being movable in bending or rotation about a horizontal axis orthogonal to the longitudinal axis of the fibers to be welded together, and each of said lateral supports respectively including at least one fiber to be welded, said micro-welder comprising:

means for securing said optical fibers to said lateral supports;

electrodes for performing the welding; and first displacement means of low accuracy for displacing said moving lateral support to move said ends towards each other in translation movement along a displacement direction parallel to the longitudinal axis of said fibers carried by said moving support;

said stand further comprising:

a central support lying in an intermediate space between said lateral supports and provided with guide means for guiding the ends of said fibers to be welded together so that they face each other; and second displacement means of high accuracy for said moving lateral support to drive said fibers carried by said moving support through accurate translation movements along said displacement direction, said second means being constituted by a cam bearing against said moving lateral support from the outside of said intermediate space and adapted for performing rotary motion about a vertical axis orthogonal to said longitudinal axis, said first displacement means also being adapted to displace said axis of rotation of said cam in a vertical plane that contains said axis of rotation and that is parallel to said longitudinal axis.

2. A micro-welder according to claim 1, wherein said first displacement means press directly against said second displacement means, said first and second displacement means thus being disposed relative to said moving lateral support on the outside of said intermediate space.

3. A micro-welder according to claim 1, wherein each of said lateral supports is moving and provided respectively with both its own one of said first displacement means and its own one of said second displacement means.

4. A micro-welder according to claim 1, wherein said first displacement means are constituted at least by a micrometer spindle controlled by a manual advance knob.

5. A micro-welder according to claim 1, wherein said stand and said central support are integral and made of molded plastic.

6. A micro-welder according to claim 1, wherein said lateral supports are molded with said stand and each of said lateral supports is recessed at its bottom end so that said bottom ends with reduced thickness act as hinged.

7. A micro-welder according to claim 1, wherein said lateral supports are fixed to said stand via hinge components.

8. A micro-welder according to claim 1, wherein said means for securing said fibers on said lateral supports comprise two cylindrical fiber-carrying mandrels made of metal and fixed on said lateral supports by magnets inserted for this purpose inside said lateral supports.

9. A micro-welder according to claim 1, wherein said accurate guide means for said fibers comprise two V-shaped guides machined in a piece of ceramics fixed on said central support.

10. A micro-welder according to claim 1, wherein said electrodes are disposed in a horizontal plane containing said guide means and extending orthogonally to said guide means.

11. A micro-welder according to claim 1, further comprising an optical device for observing the ends of said fibers, said optical device comprising a microscope and optical means for co-operating with said microscope to form simultaneous images of said ends on a single screen as seen along two mutually orthogonal viewing directions.

12. A micro-welder according to claim 11, wherein said optical means are constituted by two mirrors that are symmetrical about a vertical Y-axis orthogonal to said longitudinal axis, each mirror being inclined at an angle $\alpha/2$ relative to said Y-axis and being situated in a portion of a horizontal plane containing said ends of said fibers, and facing said portion.

13. A micro-welder according to claim 11, wherein said optical means comprise four mirrors situated above a portion of a horizontal plane containing said ends of said fibers, said mirrors being disposed symmetrically about a vertical Y-axis orthogonal to said longitudinal axis, two of said mirrors being parallel and on opposite sides of the Y-axis and two other mirrors being inclined at an angle $\beta$ relative to the Y-axis and likewise being situated on opposite sides of said Y-axis.

14. A micro-welder according to claim 11, wherein said mirrors are retractable and removable.

15. A micro-welder according to claim 12, wherein the value of the angle $\alpha$ is 135°.

16. A micro-welder according to claim 13, wherein the value of the angle $\beta$ is 45°.

17. A micro-welder according to claim 1, wherein said electrodes are removable.

18. A welding method implementing the micro-welder according to claim 1, said method comprising: a step of adjusting the mean position of said ends of said fibers relative to each other by using said first displacement means, and then a step of finely adjusting said position by displacing said ends with high accuracy using said second displacement means.

19. A method according to claim 18, further comprising the following operations:
polishing the end and side surfaces of said fibers before putting said ends of said fibers into contact with each other;
striking an arc between said electrodes when said fibers have been put into end-to-end contact using said first displacement means;
arc welding said fibers while simultaneously causing the fibers to interpenetrate;
annealing the weld formed in this way;
applying traction to said fibers;
said traction being applied in a continuous cycle directly after said annealing, the outside profile of said cam(s) being adapted so that rotation of said cam(s) firstly causes said fibers to interpenetrate, then maintains said interpenetration constant during said annealing, and finally enables said traction to be applied to said fibers, these three stages following one another without interruption in the motion of the cam(s) in a continuous cycle of relative translation movements of said fibers.

* * * * *